(12) United States Patent
Soshi et al.

(10) Patent No.: US 6,445,336 B2
(45) Date of Patent: Sep. 3, 2002

(54) RADAR DEVICE AND ON-VEHICLE RADAR DEVICE

(75) Inventors: Kunihiko Soshi; Shoji Kawata; Mitsuyoshi Saiki, all of Aichi-ken (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/794,148

(22) Filed: Feb. 28, 2001

(30) Foreign Application Priority Data

Feb. 28, 2000 (JP) ........................................ 2000-052392

(51) Int. Cl.[7] ........................ G01S 13/93; G01S 13/536
(52) U.S. Cl. ........................... 342/70; 342/27; 342/28; 342/89; 342/104; 342/107; 342/109; 342/118; 342/128
(58) Field of Search ............................ 342/27, 28, 70, 342/71, 72, 89–93, 104–118, 128–133, 192–197, 147, 158, 175

(56) References Cited

U.S. PATENT DOCUMENTS 5,677,695 A * 10/1997 Suzuki et al. ................ 342/109
5,949,366 A * 9/1999 Herrmann .................... 342/72
5,982,321 A * 11/1999 Iihoshi et al. ................ 342/158

FOREIGN PATENT DOCUMENTS

JP          07-077576 A       3/1995

\* cited by examiner

Primary Examiner—Bernarr E. Gregory
(74) Attorney, Agent, or Firm—Sughrue Mion, PLLC

(57) ABSTRACT

A radar device in which a much more precise demodulation can be made with an inexpensive circuit, free of the output variation of the frequency-modulated transmission signal. The radar device includes an oscillator which produces and outputs a frequency-modulated electromagnetic wave to a switching circuit by way of a directional coupler. The switching circuit uses switching modulation to radiate the electromagnetic wave from a transmitting antenna. The radiated electromagnetic wave after being reflected from an obstacle is received at a reception antenna. A mixer mixes this reception signal and a local signal fed from the directional coupler to produce a mixing signal which is to be fed to a high pass filter. The high pass filter deletes a low frequency output variation noise which is contained in the mixing signal and which occurs in the frequency modulation in the oscillator. The resulting mixing signal is, with the noise deleted, fed by way of an AC amplifier, to a switching demodulating circuit.

7 Claims, 3 Drawing Sheets

RADAR DEVICE AND ON-VEHICLE RADAR DEVICE

BACKGROUND OF THE INVENTION

1. Field of the Invention

The present invention is generally directed to a radar device and an on-vehicle radar device and in particular to a radar device and an on-vehicle radar device, in each of which demodulating of the reflected wave can be performed free from an output variation of the frequency-modulated transmission signal.

2. Prior Art

In recent years, environmental monitoring technologies such as vehicle cruising assisting devices, inter-vehicle distance control devices, collision alarm control devices, and automatic cruising control devices have been a focus of constant attention. In each of these devices, an extremely high frequency radar device is employed which uses beamed and reflected waves for measuring inter-vehicle distance (or a relative distance to an obstacle) and relative speed compared to a preceding vehicle. The calculated or measured distance and the relative speed are used in any one of an inter-vehicle distance control, a collision alarm control, and an automatic cruising control. As the extremely high frequency radar device, FM-CW radar devices (frequency modulated-continuous wave) have been widely used. In an FM-CW radar device, the transmission signal which is in the form of successive waves is frequency modulated at an FM-CW transmitter such that the waveform is triangle shaped. The resultant transmission signal is radiated, as a transmission wave, from a transmitting antenna.

The transmission wave radiated from the transmitting antenna is reflected by the obstacle and the resultant or reflected wave is received at a reception antenna. An FM-CW receiver mixes the reflected wave received at the reception antenna (i.e. reception signal) and the modulated transmission signal to produce a beat signal and extracts a relative distance frequency component and a relative speed frequency component to calculate a distance to the obstacle and a relative speed vs. the obstacle, respectively.

The aforementioned frequency modulation which shapes the wave into a triangle is performed at a frequency modulator. The frequency modulator is provided on a wave-guide which is made up of a dielectric-substance wire along which the successive waves are propagated from a Gunn oscillator to the transmitting antenna. The frequency modulator includes a varactor diode and adjusting a bias voltage thereof makes it possible to modulate the frequency in a substantially linear mode. In the aforementioned frequency modulation which shapes the wave there is an up-region in which the frequency is increased and a down-region in which the frequency is decreased. The frequency modulation is made to produce the up-region and the down-region alternately in repetition. That is, in the up-region the bias voltage is increased in gradual fashion to increase the frequency gradually. Then, in the subsequent down-region, the bias voltage is decreased in gradual fashion to decrease the frequency gradually.

However, in the FW-CW transmitter, the frequency-modulated transmission signal contains a low frequency component when the transmission signal is modulated at the frequency modulator, which generates an output variation in the transmission signal (i.e. power modulation). It is believed that this is due to inconstant output of the transmission signal relative to the bias voltage of the varactor diode.

Such an output variation of the transmission signal results in an imprecise beat signal produced by the mixture of the reflected wave (i.e. reception signal) and the modulated transmission signal at the mixer of the receiver. In brief, this means that it is difficult to establish high precision demodulation.

In view of such a circumstance, one solution would be to design the FM-CW radar device to employ a heterodyne system which is free from the transmission signal in demodulation. However, heterodyne systems are very complex in circuit design and are expensive to produce, resulting in that employing the heterodyne system becomes a costwise disadvantage.

Thus, a need exists to provide a radar device, for overcoming the aforementioned problems, in which a more precise demodulation can be made with an inexpensive circuit, and free from or independent of the output variation of the frequency-modulated transmission signal.

SUMMARY OF THE INVENTION

The present invention has been developed to satisfy the need noted above and a first aspect of the present invention provides a radar device wherein a transmission signal is subject to frequency-modulation, is radiated as a transmission signal from a transmitting antenna toward an obstacle, is reflected from the obstacle, and is received as a reflected wave or a reception signal, and on the basis of the transmission signal and the reception signal a beat signal is demodulated which contains a frequency component of a relative speed vs. the obstacle and a frequency component of a relative distance to the obstacle, wherein the radar device comprises a filter for deleting an output variation noise contained in the transmission signal which is frequency-modulated at the oscillator.

A second aspect of the present invention is to provide a radar device which comprises: an oscillator producing a frequency-modulated electromagnetic wave; a transmitting antenna radiating the electromagnetic wave as a transmission signal; a reception antenna receiving, as a reception signal, a reflected signal which is produced when the transmission signal is reflected from an obstacle; a directional coupler which extracts a local signal from the electromagnetic wave produced at the oscillator; a mixer mixing the local signal fed from the directional coupler and the reception signal fed from the reception antenna; an AC amplifier for AC-amplifying a mixing signal produced at the mixer; a demodulation circuit producing a beat signal which contains a frequency component of a relative speed vs. the obstacle and a frequency component of a relative distance to the obstacle, the demodulation circuit being in the form of a switching demodulation circuit; a switching circuit modulating the reception signal in switching mode before being fed to the mixer; and a high pass filter disposed between the mixer and the AC amplifier.

A third aspect of the present invention is to provide a radar device whose gist is to modify the structure as set forth in the second aspect, wherein the switching circuit is disposed between the directional coupler and the transmitting antenna.

A fourth aspect of the present invention is to provide a radar device whose gist is to modify the structure as set forth in the second aspect, wherein the switching circuit is disposed between the reception antenna and the mixer.

A fifth aspect of the present invention is to provide an on-vehicle radar device which comprises a radar device as defined in the first, second, third, and fourth embodiments wherein the radar device is mounted on an automotive vehicle and produces the beat signal for calculating a relative distance between the automotive vehicle and the obstacle and a relative speed as between the automotive vehicle and the obstacle.

In accordance with the first aspect of the present invention, the filter deletes the output variation noise contained in the reception signal which was originally contained in the transmission signal. Thus, a circuit which can be made inexpensive can demodulate a higher precision beat signal which is free from the output variation noise in the transmission signal.

In accordance with the second aspect of the present invention, the reception signal is, after being switching-modulated at the switching circuit, fed to the mixer. The mixer mixes this switching-modulated signal and the local signal from the directional coupler. At the high pass filter, the low frequency output variation noise of the resultant mixing signal is deleted. At this time, due to the switching modulation of the mixing signal, the low frequency beat signal fails to be deleted in switching modulation, and includes a frequency component corresponding to a relative distance to the obstacle and a frequency component corresponding to relative velocity. Thus, the beat signal component can be accurately demodulated.

In accordance with the third aspect of the present invention, the switching modulation of the reception signal is made at the switching circuit provided between the directional coupler and the transmitting antenna.

In accordance with the fourth aspect of the present invention, the switching modulation of the reception signal is made at the switching circuit provided between the mixer and the reception antenna.

In accordance with the fifth aspect of the present invention, mounting the radar device on the automotive vehicle makes it possible to establish at least any one of inter-vehicle distance control, collision alarm control, and automatic cruising control with much higher precision.

BRIEF DESCRIPTION OF THE DRAWINGS

The above and other objects, features arid advantages of the present invention will be more apparent and more readily appreciated from the following detailed description of preferred exemplary embodiments of the present invention, taken in connection with the accompanying drawings, in which.

DETAILED DESCRIPTION OF THE INVENTION

Hereinafter, the structure, operation, and advantages of an on-vehicle (i.e. on-automotive-vehicle) FM-CW radar device will be explained in detail with reference to embodiments shown in the Figures.

Figure 1:
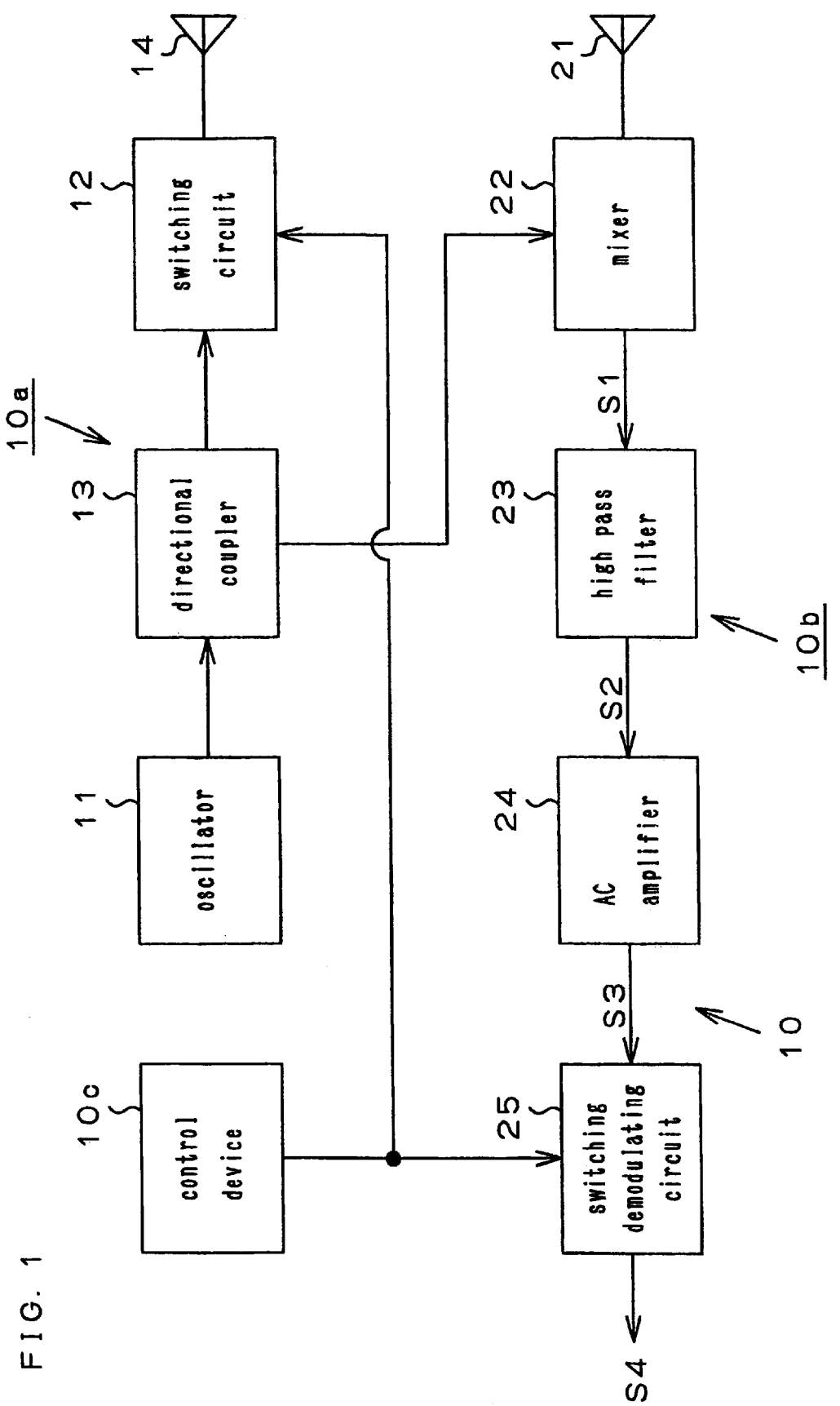
FIG. 1 illustrates a block diagram of an on-vehicle FM-CW radar device in accordance with an embodiment of the present invention.

Referring first to FIG. 1, there is illustrated a block diagram of the FM-CW radar device 10 as a typical example of a radar device. The FM-CW radar device 10 includes a transmitter 10a and a receiver 10b.

The transmitter 10a has an oscillator 11, a switching circuit 12, a directional coupler 13, and a transmitting antenna 14. In the present embodiment, the oscillator 11 produces and outputs a frequency-modulated electromagnetic wave whose central frequency is 60.5 GHz and whose amplitude varies in a triangular shape. In detail, the oscillator 11a, which is of a well-known structure, is made up of an extremely high frequency oscillating device and a frequency modulator with a metal-strip resonator and a varactor diode.

When a Gunn diode of the extremely high frequency oscillating device resonates with the metal-strip resonator, the electromagnetic wave having a frequency of 60.5 GHz is oscillated. The resulting electromagnetic wave is outputted from the metal-strip resonator is propagated along a main or principal wave-guide which is made up of a non radiative dielectric guide (NRD guide). The electromagnetic wave which is propagated along the main wave-guide is subject to a frequency modulation such that the resultant modulated electromagnetic wave is made to have a central frequency of 60.5 GHz. At this stage, in the present embodiment, the modulation width is set to be 100 MHz and a repetition modulation cycle is set to be 1 millisecond which is defined as the sum of an up-range in which the frequency is increased and a down-range in which the frequency is decreased.

The frequency-modulated electromagnetic wave is outputted to the switching circuit 12 by way of the NRD guide which is made up of the principal wave-guide. In addition, a part of the frequency-modulated electromagnetic wave is supplied, as a local signal, to the receiver 10b along the NRD guide through the directional coupler 13.

The switching circuit 12, which is in the form of a transmission diode switch having a pin diode, controls the electromagnetic wave which is outputted from the oscillator 11 in such a manner that the electromagnetic wave is allowed to pass through the switching circuit 12 along the NRD guide for being radiated from the transmitting antenna 14 or the electromagnetic wave is not allowed to pass through the switching circuit 12 and not radiated from the transmitting antenna 14. In detail, when the pin diode which constitutes the switching circuit 12 is made OFF, the pin diode allows the electromagnetic wave to pass therethrough, resulting in that the electromagnetic wave is radiated from the transmitting antenna 14. On the other hand, when the pin diode is made ON, the resultant pin diode absorbs the electromagnetic wave, thereby interrupting or prohibiting the radiation of the electromagnetic wave from the transmitting antenna 14. In the present embodiment, the switching circuit 12 radiates the electromagnetic wave, as a transmission signal, from the transmitting antenna 14 in intermittent fashion by controlling the switching circuit 12 in such manner that the pin diode is made ON and OFF alternately in repetition at a cycle of 1.0 microsecond (i.e. at a frequency of 1 MHz). That is, the transmission signal is subject to switching modulation at the switching circuit 12. The control device 10c issues a control signal SGC for the aforementioned control of the switching circuit 12 at a cycle of 1.0 microsecond.

Next, hereinafter the receiver 10b will be detailed. The receiver 10b includes a reception antenna 21, a mixer 22, a high pass filter 23, an AC amplifier 24, and a switching demodulating circuit 25.

The reception antenna 21 catches an echo of the intermittently transmitted electromagnetic wave from the transmitting antenna 14, i.e. the electromagnetic wave after reflection at an obstacle. The resultant electromagnetic wave is fed, as a received signal, by way of the NRD guide to the mixer 22. The mixer 22 receives both this received signal from the reception antenna 21 and the local signal from the directional coupler 13. The mixer 22 mixes the received signal and the local signal to produce a mixing signal f3(=f2−f1) by subtracting a frequency f1 of the local signal (i.e. the frequency modulated electromagnetic signal which is oscillated at the oscillator 11) from a frequency f2 of the received signal. The mixing signal S1, as apparent from FIG. 2(a), has a low frequency component which is indicated by a dot-dashed line.

The low frequency component results from a power modulation at the transmitter 10a. In detail, with respect to the varactor diode of the oscillator 11, relative to its bias voltage, the output electromagnetic signal (i.e. transmission signal) is not constant or varies. Thus, the resulting electromagnetic wave (i.e. transmission signal) is subject to both the triangle frequency and power modulations and the power modulation produces the low frequency component in the mixing signal S1.

Figure 2:
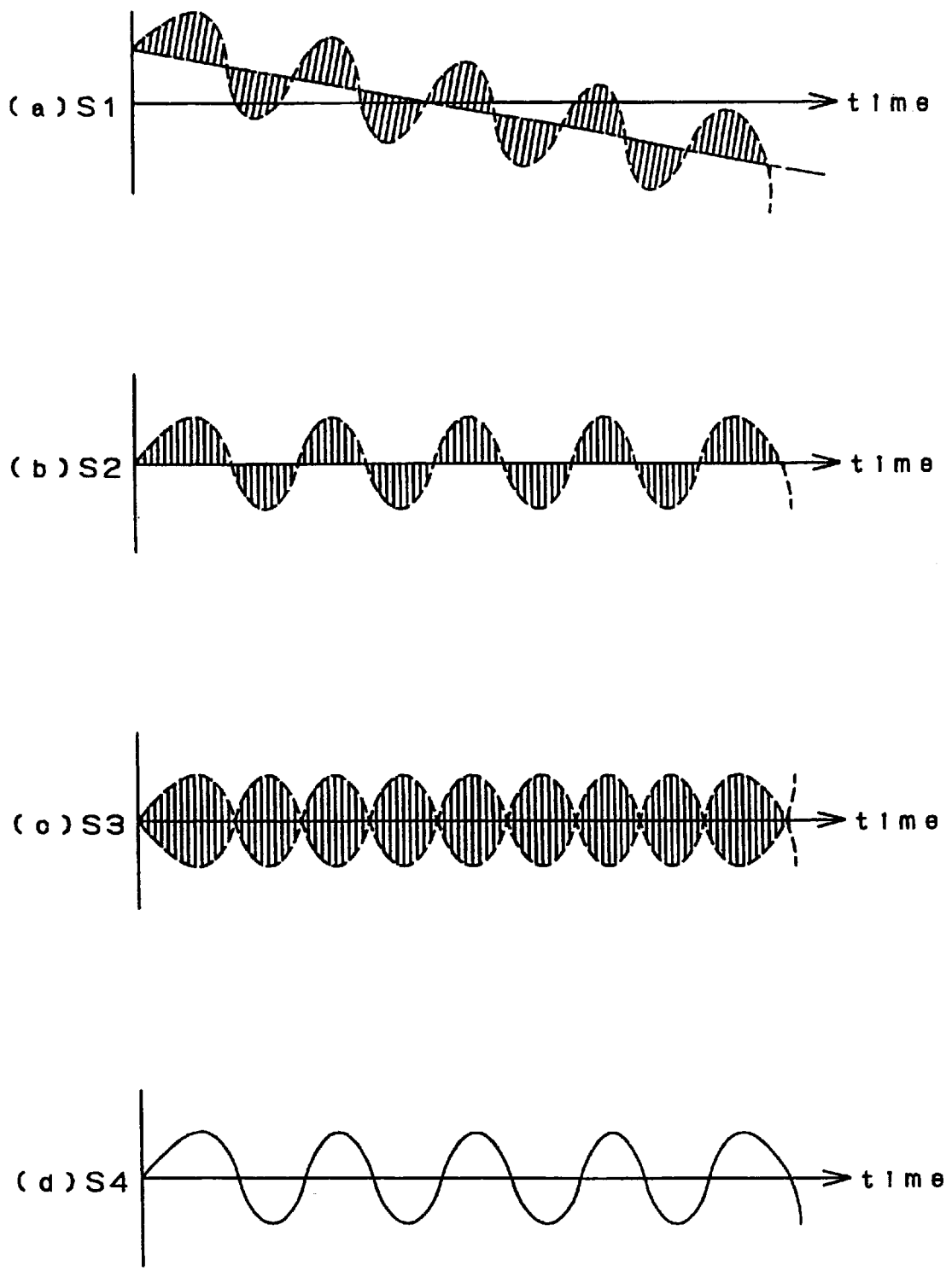
FIG. 2 illustrates an output wave shape at each of the circuits of a receiver of the on-vehicle FM-CW radar device which is illustrated in FIG. 1.

The mixing signal S1 is outputted to the high pass filter 23. The high pass filter 23 cuts the low frequency component of the mixing signal S1. Thus, the resultant mixing signal S2 is made to have a wave shape as shown in FIG. 2(b) which has the lower-frequency-component deleted. After deletion of the lower frequency component at the high pass filter 23, the mixing signal S2 is fed or outputted to the AC amplifier 24. At the AC amplifier 24, the mixing signal S2 which is inputted thereto is amplified to produce a detected signal S3. The detection signal S3 is of a wave shape as shown in FIG. 2(c) and is inputted to the next stage or the switching demodulating circuit 25. The demodulating circuit 25 receives, as sampling signals, the detected signal S3 and the control signal SGC which is outputted from the controller 10c. That is, for example, in response to a rising stage of the control signal SGC the detected signal S3 is held as a sample and in response to the next rising stage of the control signal SGC the detected signal S3 is held as another sample. Thus, a beat signal S4 is produced as shown in FIG. 2(d).

This beat signal S4 includes a frequency component of distance, corresponding to a relative distance to the obstacle and a frequency component of velocity, corresponding to relative velocity. The beat signal S4 is digitized at an A/D converting circuit (not shown) and is processed for calculating the relative distance to and relative speed of the obstacle.

The above described embodiment has the following advantages.

(1) In the present embodiment, a high pass filter is interposed or provided between the mixer 22 and the AC amplifier 24, which makes it possible to delete or eliminate a noise (i.e. the low frequency component) contained in the mixing signal S1 outputted from the mixer 22 which results from the varying output of the oscillator 11. Thus, a beat signal S4 which is of high precision or accuracy can be obtained by employing the high pass filter 23, which is an inexpensive circuit, resulting in higher precision calculation of each of the relative distance to the obstacle and the relative speed of the obstacle. Consequently, with respect to the automotive vehicle on which this device is mounted, an inter-vehicle distance control, a collision alarm control, and an automatic driving control can be operated with much higher precision.

(2) In the present embodiment, the transmission signal is radiated from the transmitting antenna 14 in intermittent fashion by controlling the switching circuit 12 by repeating the alternative ON-and-OFF condition at a cycle of 1.0 microsecond (i.e. at a frequency of 1 MHz). Thus, the low frequency beat signal S4 fails to be deleted in switching modulation. Therefore, only the noise (i.e. low frequency component) can be deleted which results from the variation of the output of the oscillator 11.

(3) In the present embodiment, the mixer 22 uses, as the local signal, the transmission signal issued from the oscillator 11 by way of the directional coupler 13, which does not require a specially designed oscillator such as a local oscillator which operates on a heterodyne system, resulting in that demodulating the beat signal S4 can be made with much higher precision, inexpensively, and with a simple circuit.

The embodiment of the present invention is not limited to the above and other embodiments can be attained by employing the following arrangement or concepts.

Figure 3:
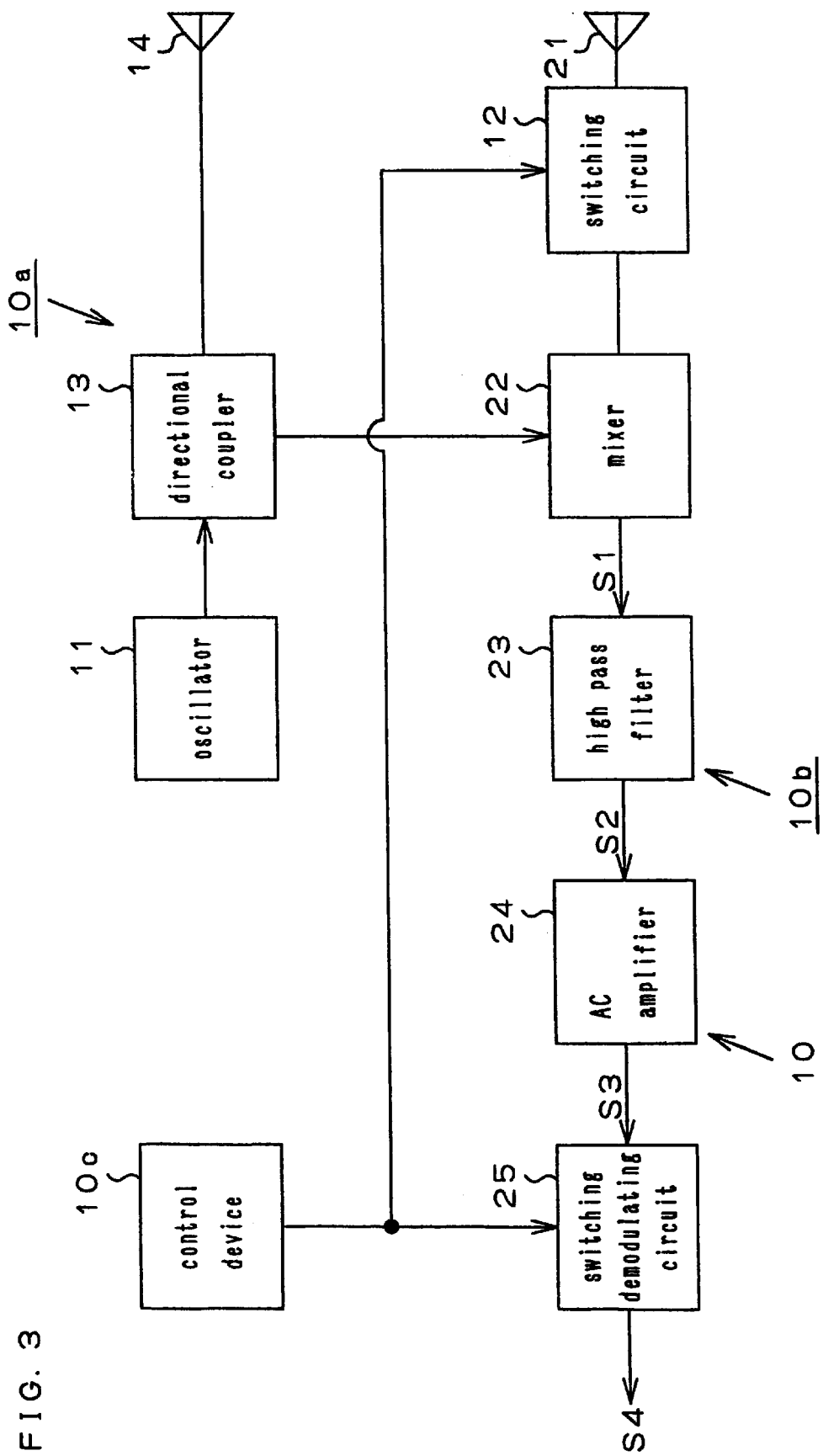
FIG. 3 illustrates a block diagram of another on-vehicle FM-CW radar device as a modification of the on-vehicle FM-CW radar device which is illustrated in FIG. 1.

Instead of placing the switching circuit 12 at the side of the transmitter 10, as illustrated in FIG. 3, the switching circuit 12 can be disposed between the reception antenna 21 and the mixer 22. Such an arrangement, similar to the aforementioned embodiment, can delete only the noise (i.e. low frequency component) which results from the output variation of the oscillator 11, thereby providing advantages similar to the foregoing advantages (1), (2), and (3).

Instead of embodying the present invention as an on-vehicle radar device as disclosed in the aforementioned embodiment, the present invention can be embodied on automated guided vehicles, railway vehicles, ships, and others. In such a case, advantages can be attained which are similar to the foregoing advantages (1), (2), and (3).

In the foregoing embodiment, the switching circuit 12 is in the form of a pin diode, which means that the switching circuit 12 performs switching modulation. Other circuits capable of performing switching modulation can similarly be substituted. One such circuit is a combination of a circulator and a short circuit diode.

It is to be noted that setting the value of central frequency to be 60.5 GHz in the foregoing embodiment is not restrictive and other millimeter spectrum is available, such as 76.5 GHz.

The invention has thus been shown and description with reference to specific embodiments, however, it should be understood that the invention is in no way limited to the details of the illustrated structures but changes and modifications may be made without departing from the scope of the appended claims.

What is claimed is:

1. A radar device comprising:

an oscillator producing a frequency-modulated electromagnetic wave;

a transmitting antenna radiating the electromagnetic wave as a transmission signal;

a reception antenna receiving, as a reception signal, a reflected signal which is produced when the transmission signal is reflected from the obstacle;

a directional coupler which extracts a local signal from the electromagnetic wave produced at the oscillator;

a mixer mixing the local signal fed from the directional coupler and the reception signal fed from the reception antenna;

an AC amplifier for AC-amplifying a mixing signal produced at the mixer;

a switching demodulation circuit producing a beat signal comprising a frequency component representing a relative speed relative to the obstacle and a frequency component representing a relative distance to the obstacle;

a switching circuit modulating the reception signal in switching mode for being fed to the mixer; and a high pass filter disposed between the mixer and the AC amplifier.

2. A radar device as set forth in claim 1, wherein the switching circuit is disposed between the directional coupler and the transmitting antenna.

3. An on-vehicle radar device comprising a radar device as set forth in claim 2, wherein the radar device is mounted on an automotive vehicle, and said beat signal is used to calculate at least one of a relative distance between the automotive vehicle and the obstacle and a relative speed between the automotive vehicle and the obstacle.

4. A radar device as set forth in claim 1, wherein the switching circuit is disposed between the reception antenna and the mixer.

5. An on-vehicle radar device comprising a radar device as set forth in claim 4, wherein the radar device is mounted on an automotive vehicle, and said beat signal is used to calculate at least one of a relative distance between the automotive vehicle and the obstacle and a relative speed between the automotive vehicle and the obstacle.

6. An on-vehicle radar device comprising a radar device as set forth in claim 1, wherein the radar device is mounted on an automatic vehicle, and said beat signal is used to calculate at least one of a relative distance between the automotive vehicle and the obstacle and a relative speed between the automotive vehicle and the obstacle.

7. An on-vehicle radar device comprising a radar device as set forth in claim 1, wherein the radar device is mounted on an automotive vehicle, and said beat signal is used to calculate a relative distance between the automotive vehicle and the obstacle and a relative speed between the automotive vehicle and the obstacle.

* * * * *